United States Patent
Truskalo

(12) 
(10) Patent No.: US 6,274,989 B1
(45) Date of Patent: Aug. 14, 2001

(54) DYNAMIC DAMPING CLAMPER ARRANGEMENT ASSOCIATED WITH S-SHAPING CAPACITOR

(76) Inventor: Walter Truskalo, 8730 Pemberton Cir., Indianapolis, Marion County, IN (US) 46260

( * ) Notice: Subject to any disclaimer, the term of this patent is extended or adjusted under 35 U.S.C. 154(b) by 0 days.

(21) Appl. No.: 09/246,279

(22) Filed: Feb. 8, 1999

Related U.S. Application Data

(60) Provisional application No. 60/115,708, filed on Jan. 12, 1999.

(51) Int. Cl.[7] .................................................. G09G 1/04
(52) U.S. Cl. .......................... 315/370; 315/369; 315/408; 315/411
(58) Field of Search .................................. 315/370, 371, 315/364, 369, 411, 408; G09G 1/04

(56) References Cited

U.S. PATENT DOCUMENTS

| | | | |
|---|---|---|---|
| 3,349,279 | 10/1967 | Schafft | 315/27 |
| 3,895,305 | * 7/1975 | Longman, Jr. | 328/171 |
| 4,019,093 | 4/1977 | Klein | 315/370 |
| 4,130,783 | 12/1978 | de Hollander | 315/371 |
| 4,533,855 | 8/1985 | Willis et al. | 315/370 |
| 4,612,481 | 9/1986 | Storberg | 315/370 |
| 4,695,774 | 9/1987 | Gent et al. | 315/408 |
| 4,707,640 | 11/1987 | Onozawa et al. | 315/408 |
| 4,761,586 | * 8/1988 | Wharton | 315/408 |
| 5,010,281 | * 4/1991 | Rodriguez-Cavazos | 315/411 |
| 5,182,504 | 1/1993 | Haferl | 315/370 |
| 5,402,044 | 3/1995 | Haferl | 315/371 |
| 6,111,371 | * 8/2000 | Aaron et al. | 315/408 |
| 6,114,817 | * 9/2000 | Fernsler | 315/411 |

* cited by examiner

Primary Examiner—Don Wong
Assistant Examiner—Shih-Chao Chen
(74) Attorney, Agent, or Firm—Joseph S. Tripoli; Harvey D. Fried; Sammy S. Henig

(57) ABSTRACT

A resistor-capacitor-diode clamp is coupled to an S-capacitance of a horizontal deflection circuit output stage for reducing ringing by causing critical damping. The supply voltage of the output stage varies at a vertical rate parabolic manner for modulating the horizontal deflection current to provide East-West correction. A clamp capacitor of the clamp has a terminal that is direct current coupled to the supply voltage. Therefore, each terminal of the clamp capacitor has the same vertical rate parabola component. Consequently, the DC voltage difference developed between the terminals of the clamp capacitor does not include any vertical rate parabola component, the result is that the sensitivity of the damping to the supply voltage vertical rate variations is, advantageously, eliminated or reduced.

6 Claims, 1 Drawing Sheet

DYNAMIC DAMPING CLAMPER ARRANGEMENT ASSOCIATED WITH S-SHAPING CAPACITOR

Figure 1:
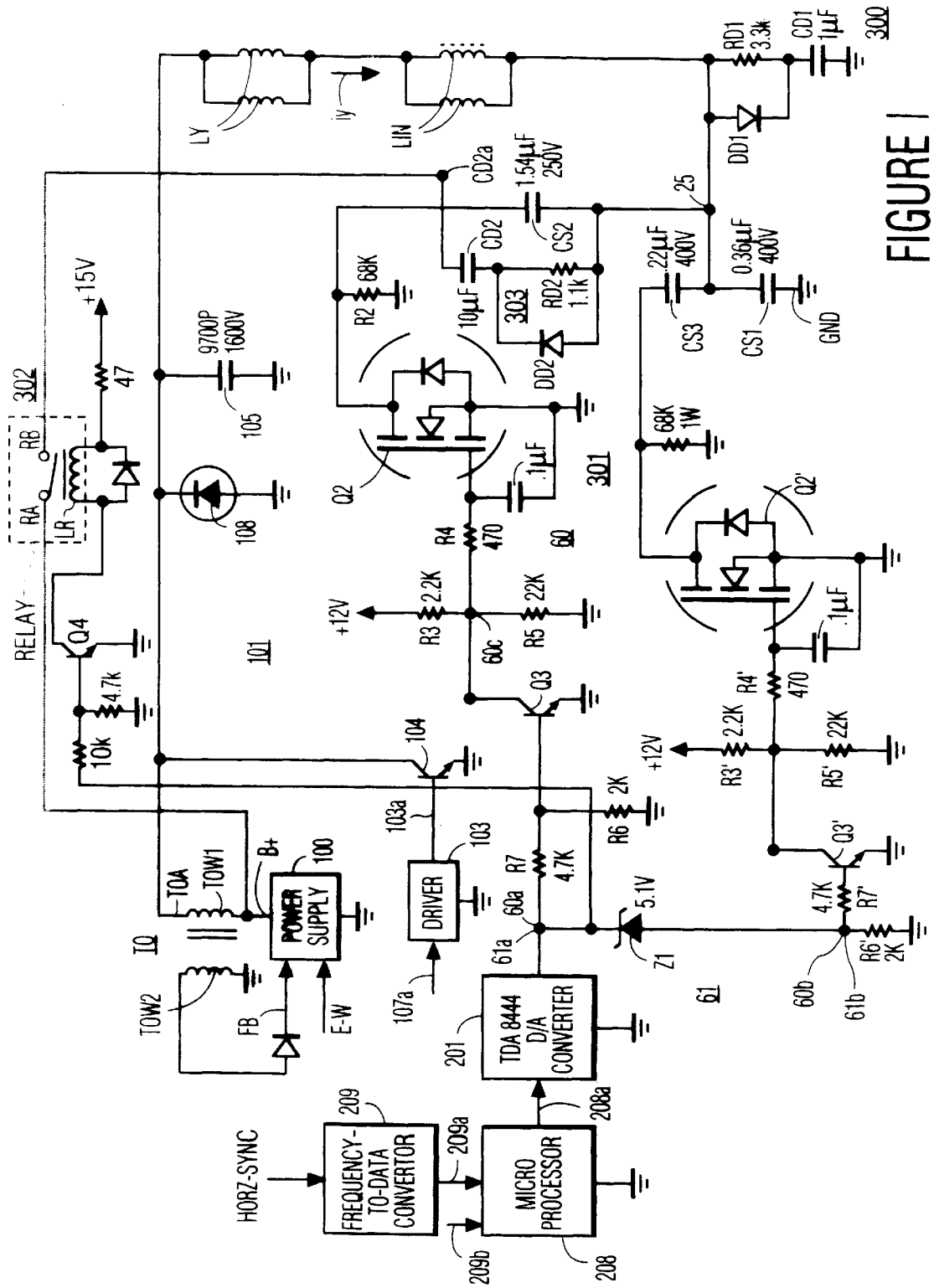

This appln claims the benefit of Provisional No. 60/115,708 filed Jan. 12, 1999.

The invention relates to a dynamic clamping arrangement of a deflection circuit.

A television receiver, computer or monitor may have the capability of selectively displaying picture information in the same color cathode ray tube (CRT) using a deflection current at different horizontal scan frequencies. Typically, an S-capacitor is coupled to a horizontal deflection winding of a horizontal deflection circuit output stage to correct a deflection related beam landing error referred to as S correction.

A horizontal rate synchronizing signal that controls the horizontal deflection circuit may be subject to an abrupt phase change in a horizontal period that occurs, during the vertical blanking interval. Such abrupt phase change may be, for example, deliberately introduced to thwart unauthorized video recording of the video signal. Consequently, the stored energy in an inductance coupled to the supply voltage of the horizontal deflection circuit output stage may temporarily increase.

The increased stored energy is subsequently dissipated. However, disadvantageously, the return to steady state operation may be accompanied with ringing in currents and voltages produced in the horizontal deflection circuit output stage. A resistor-capacitor-diode (RCD) clamp coupled across the S-capacitance has been used to reduce such ringing by forcing the horizontal deflection circuit output stage to operate near critical damping.

Another type of distortion that is corrected is referred to as East-West or pincushion distortion. A known way of providing East-West distortion correction is to vary the magnitude of the supply voltage of the horizontal deflection circuit output stage at a vertical rate parabolic manner for modulating the horizontal deflection current. The magnitude of the supply voltage is controlled in a conventional way, in accordance with a vertical rate parabola signal. In such an arrangement, the extent of damping provided by the aforementioned RCD clamp coupled across the S-capacitance may, undesirable, vary as the supply voltage varies, during vertical scanning. It may be desirable to reduce the sensitivity of the damping to the supply voltage vertical rate variations.

In carrying out an inventive feature, the pair of terminals of the clamp capacitor of the RCD clamp is coupled between the supply voltage and the S-capacitance. Each terminal of the clamp capacitor develops equal magnitude of vertical rate parabola component. Consequently, the voltage difference developed between the terminals of the clamp capacitor does not include any vertical rate parabola component. Therefore, the sensitivity of the damping to the supply voltage vertical rate variations is, advantageously, eliminated or reduced.

A video display deflection apparatus, embodying an aspect of the invention includes a source of an input signal at a frequency related to a horizontal deflection frequency. A horizontal deflection winding is coupled to a retrace capacitance and to a switch, responsive to the first input signal, for generating a horizontal deflection current in the horizontal deflection winding. An S-shaping capacitor is coupled to the horizontal deflection winding for developing a voltage in the S-shaping capacitor that varies in a manner to provide horizontal linearity distortion correction. A source of a second signal that varies at a frequency related to a vertical deflection frequency is coupled to the S-shaping capacitor for varying the S-shaping capacitor voltage in accordance therewith for providing East-West distortion correction. A third capacitor is coupled to a rectifier to form a clamp circuit for clamping the S-shaping capacitor voltage, during a portion of a horizontal period. The third capacitor has a first terminal coupled to the S-shaping capacitor and a second terminal coupled to the second signal source for developing, from the second signal, voltage variations at each of the first and second terminals of the third capacitor that compensate each other.

The sole FIGURE illustrates a clamp, embodying an aspect of the invention, coupleds acrossed a switched S-capacitor of a horizontal deflection circuit output stage.

The sole FIGURE illustrates a horizontal deflection circuit output stage 101 of a television receiver having multi-scan frequency capability. Stage 101 is energized by a regulated power supply 100 that generates a supply voltage B+. A conventional driver stage 103 is responsive to an input signal 107a at the selected horizontal scanning frequency $nf_H$. Driver stage 103 generates a drive control signal 103a to control the switching operation in a switching transistor 104 of output stage 101. By way of example, a value of n=1 may represent the horizontal frequency of a television signal according to a given standard such as a broadcasting standard. The collector of transistor 104 is coupled to a terminal T0A of a primary winding T0W1 of a flyback transformer T0. The collector of transistor 104 is also coupled to a retrace capacitor 105. The collector of transistor 104 is additionally coupled to a horizontal deflection winding LY to form a retrace resonant circuit. The collector of transistor 104 is also coupled to a conventional damper diode 108. Winding LY is coupled in series with a linearity inductor LIN and a non-switched trace or S-capacitor CS1. Capacitor CS1 is coupled between a terminal 25 and a reference potential, or ground GND such that terminal 25 is interposed between inductor LIN and S-capactor CS1.

Output stage 101 is capable of producing a deflection current iy. Deflection current iy has substantially the same predetermined amplitude for any selected horizontal scan frequency of signal 103a selected from a range of 2 $f_H$ to 2.4$f_H$ and for a selected horizontal frequency of 1 $f_H$. The horizontal frequency of 1$f_H$ is at, for example, approximately 16 KHz. Controlling the amplitude of deflection current iy is accomplished by automatically increasing voltage B+ when the horizontal frequency increases, and vice versa, so as to maintain constant amplitude of deflection current iy. Voltage B+ is controlled by a conventional regulated power supply 100 operating in a closed-loop configuration via a feedback winding T0W2 of transformer T0. The magnitude of voltage B+ is regulated, in accordance with a rectified, feedback flyback pulse signal FB having a magnitude that is indicative of the amplitude of current iy. A vertical rate parabola signal E-W is generated in a conventional way, not shown. Signal E-W is conventionally coupled to power supply 100 for producing a vertical rate parabola component of voltage B+ to provide for East-West distortion correction.

A switching circuit 60 is used for correcting a beam landing error such as linearity. Circuit 60 selectively couples none, only one or both of a trace capacitor CS2 and a trace capacitor CS3 in parallel with non-switched trace capacitor CS1. The selective coupling is determined as a function of the range of frequencies from which the horizontal scan frequency is selected. In switching circuit 60, capacitor CS2 is coupled between terminal 25 and a drain electrode of a field effect transistor (FET) switch Q2. A source electrode of transistor Q2 is coupled to ground GND. A protection resistor R2 that prevents excessive voltage across transistor Q2 is coupled across transistor Q2.

A control signal 60a is generated in a digital-to-analog (D/A) converter 201. Control signal 60a is coupled via a voltage divider that includes a resistor R7 and a resistor R6 to a base electrode of a threshold determining transistor Q3. An intermediate terminal 60c disposed between a resistor R3 and a resistor R5, forming a pull-up voltage divider, is coupled to the collector of transistor Q3 and, via a protection resistor R4 to a gate electrode of transistor Q2. When control signal 60a is sufficiently large to turn on transistor Q3, the gate voltage of transistor Q2 is zero and transistor Q2 is turned off. On the other hand, when control signal 60a is not sufficiently large to turn on transistor Q3, the gate voltage of transistor Q2 is pulled up by the voltage produced via resistors R3 and R5 and transistor Q2 is turned on.

Signal 60a is coupled via a threshold determining arrangement of a zener diode Z1 coupled in series with resistor R6' to develop switch control signal 60b at a terminal 61b. Signal 60b is developed between diode Z1 and resistor R6'. Signal 60b is coupled to the base of transistor Q3' via a base resistor R7'.

In switching circuit 60, capacitor CS3 is coupled between terminal 25 and a drain electrode of a FET switch Q2'. FET switch Q2' is controlled by control signal 60b in a similar way that FET switch Q2 is controlled by control signal 60a. Thus, resistors R3', R4' and R5' and transistor Q3' are coupled to one another and perform similar functions as resistors R3, R4 and R5 and transistor Q3, respectively.

When the frequency of horizontal deflection current iy is $1f_H$, signal 60a is at a minimum level of zero volts such that the base voltage of transistor Q3 does not exceed the forward voltage of transistor Q3. Consequently, both transistors Q3 and Q3' are turned off and transistors Q2 and Q2' are turned on. The result is that both S-capacitors CS2 and CS3 are in-circuit S-capacitors that are coupled in parallel with non-switched S-capacitor CS1 and establish a maximum S-capacitance value.

When the frequency of horizontal deflection current iy is equal to or greater than $2 f_H$ and less than $2.14 f_H$ signal 60a is at an intermediate level of 5V such that the base voltage of transistor Q3 exceeds the forward voltage of transistor Q3. However, the level of signal 60a does not exceed the breakdown voltage of zener diode Z1. Consequently, transistor Q3 is turned on, transistor Q3' is turned off, transistor Q2 is turned off and transistor Q2' is turned on. The result is that S-capacitor CS2 is decoupled from non-switched S-capacitor CS1 and S-capacitor CS3 is coupled to S-capacitor CS1 to establish an intermediate S-capacitance value.

When the frequency of horizontal deflection current iy is equal to or greater than $2.14 f_H$, signal 60a is at a maximum level of 10V such that the base voltage of transistor Q3 exceeds the forward voltage of transistor Q3. Also, the level of signal 60a exceeds the breakdown voltage of zener diode Z1 by a sufficient amount to produce a base voltage of transistor Q3' that exceeds the forward voltage of transistor Q3'. Consequently, transistors Q3 and Q3' are turned on and transistors Q2 and Q2' are turned off. The result is that S-capacitors CS2 and CS3 are decoupled from non-switched S-capacitor CS1 and establish a minimum S-capacitance value.

A control circuit 61 includes a microprocessor 208 that is responsive to a data signal 209a generated in a frequency-to-data signal converter 209. Signal 209a has a numerical value that is indicative of the frequency of a synchronizing signal HORZ-SYNC or deflection current iy. Converter 209 includes, for example, a counter that counts the number of clock pulses, during a given period of signal HORZ-SYNC and generates word signal 209a in accordance with the number of clock pulses that occur in the given period. Microprocessor 208 generates a control data signal 208a that is coupled to an input of D/A converter 201. The value of signal 208a is determined in accordance with the horizontal rate of signal HORZ-SYNC. D/A converter 201 generates, in accordance with data signal 208a, analog control signal 60a at a single terminal 61a. Signal 60a is at a level that is determined by signal 208a, in accordance with the frequency of signal HORZ-SYNC. Alternatively, the value of signal 208a may be determined by a signal 209b that is provided by a keyboard, not shown.

A non-switched, clamp circuit 300 includes a capacitor CD1 coupled in series with a parallel arrangement of a rectifying diode DD1 and a damping resistor RD1. Clamp circuit 300 is coupled between terminal 25 of capacitor CS1 and ground or across S-capacitor CS1. Clamp circuit 300 is an in-circuit clamp at each horizontal scan frequency of signal 103a selected from the range of $1 f_H$ to $2.4 f_H$. Diode DD1 of clamp circuit 300 rectifies peaks of the horizontal rate voltage component at terminal 25 of S-capacitor CS1. The rectification occurs mainly when vertical scanning is at approximately the top third of the display screen. The R-C component values of clamp circuit 300 are selected to provide optimized damping, when the frequency of horizontal deflection current iy is equal to or greater than $2 f_H$.

When the operation frequency is at the lower frequency, $1 f_H$ the horizontal deflection supply voltage B+ is reduced to 70V from a higher level in the vicinity of 140V. Therefore, the rectification provided by diode DD1 of clamp circuit 300, renders a lower voltage. The result is that the power dissipated in resistor RD1 drops to about 25% of that at $2 f_H$. Consequently, disadvantageouly, at the lower frequency $1 f_H$ circuit 300 may not provide sufficient damping to prevent ringing.

Advantageously, a switched, clamp circuit 303 is coupled to terminal 25 and includes a capacitor CD2 coupled in series with a parallel arrangement of a rectifying diode DD2 and a damping resistor RD2. A terminal CD2a of capacitor CD2 that is remote from terminal 25 is coupled to supply voltage B+ via a relay contact RB and a relay contact RA of a relay 302. Coil LR of relay 302 is coupled between a supply voltage of 15V and the collector terminal of a relay control transistor Q4. The base terminal of transistor Q4 is coupled to terminal 61a.

When the horizontal frequency is equal or greater than $2 f_H$, signal 60a at terminal 61a is at the higher level causing coil LR of relay 302 to be energized via transistor Q4. This results in decoupling contact RA from contact RB. On the other hand, when the horizontal frequency is equal to $1 f_H$, signal 60a is at the lower level and causes transistor Q4 to turn off in a manner to couple capacitor CD2 to the terminal where voltage B+ is developed. Thus, clamp circuit 303 and trace capacitor CS2 are in-circuit elements when the selected horizontal scan frequency is $1 f_H$.

The component values of clamp circuit 303 are selected to supplement the damping provided by circuit 300 for providing the desired damping, when the frequency of horizontal deflection current iy is equal to $1 f_H$. Advantageously, both clamp circuits 300 and circuit 303 provide together the required clamping for eliminating ringing, when the frequency of horizontal deflection current iy is equal to $1 f_H$. Similarly to capacitor CS2, clamp circuit 303 has no effect at higher frequencies than $1 f_H$.

Had capacitor CD2 of clamp circuit 302 been coupled to ground as capacitor CD1, it would have differnetiated the E-W pincushion correction parabolic voltage component developed at terminal 25 of the in-circuit S-shaping capacitors. This is so because supply voltage B+ that determines the voltage at terminal 25 varies at a vertical rate parabolic manner. Such differentiation could have resulted in an undesirable sawtooth current component that varies at vertical rate in current iy of horizontal winding Ly. Disadvantageously, the undesirable sawtooth current component could have caused the sides of the raster to tilt.

In carrying out an inventive feature, in contrast to clamp capacitor CD1, terminal CD2a of clamp capacitor CD2 that is remote from terminal 25 is DC coupled to supply voltage B+ via relay contacts RB and RA, instead of to ground. Each terminal of capacitor CD2 develops the same amplitude and phase of the vertical rate parabola component of voltage B+. Consequently, the voltage difference developed between the terminals of clamp capacitor CD2 excludes any vertical rate parabola voltage difference. Thus, the rectified peaks of the voltage in S-capacitor CS2, for example, and the supply voltage B+ modulation are approximately equal in magnitude. Therefore, vertical rate variations in supply voltage B+, advantageously, have no effect on the damping function.

The extent of damping required is greater when the frequency of horizontal deflection current iy is equal to 1 $f_H$, than when the frequency of horizontal deflection current iy is higher. Therefore, coupling capacitor CD1 to voltage B+ is not as important as in the case of capacitor CD2.

What is claimed is:

1. A video display deflection apparatus, comprising:

a source of a first signal at a frequency related to a horizontal deflection frequency;

a horizontal deflection winding coupled to a retrace capacitance and to a switch, responsive to said first signal, for generating a horizontal deflection current in said horizontal deflection winding;

an S-shaping capacitor coupled to said horizontal deflection winding for developing a voltage in said S-shaping capacitor that varies in a manner to provide horizontal linearity distortion correction;

a source of a second signal that varies at a frequency related to a vertical deflection frequency coupled to said S-shaping capacitor for varying said S-shaping capacitor voltage in accordance therewith for providing East-West distortion correction; and a third capacitor coupled to a rectifier to form a clamp circuit for clamping said S-shaping capacitor voltage, during a portion of a horizontal period, said third capacitor having a first terminal coupled to said S-shaping capacitor and a second terminal coupled to said second signal source for developing, from said second signal, voltage variations at each of said first and second terminals of said third capacitor that compensate each other.

2. The video display deflection apparatus according to claim 1 further comprising, a source of a supply voltage responsive to said second signal and coupled to said switch via a supply inductance for modulating said deflection current to provide East-West distortion correction in accordance with a voltage variation of said supply voltage, said supply voltage producing at said first and second terminals of said third capacitor the compensating voltage variations, respectively.

3. The video display deflection apparatus according to claim 2, wherein said second terminal is coupled to said supply voltage source via a path that excludes said first terminal.

4. The video display deflection apparatus according to claim 1, wherein said clamp circuit clamps said S-shaping capacitor voltage, mainly during horizontal cycles that occur at the beginning of a vertical trace interval.

5. The video display deflection apparatus according to claim 1 further comprising, a second switch for coupling said third capacitor to said S-shaping capacitor, when the horizontal frequency is at a first value and for de-coupling said third capacitor from said S-shaping capacitor, when the horizontal frequency is at a second value.

6. The video display deflection apparatus according to claim 1 wherein said third capacitor is coupled to a resistor that is coupled in parallel with said rectifier.

* * * * *